(12) United States Patent
Landreville

(10) Patent No.: US 11,880,892 B2
(45) Date of Patent: Jan. 23, 2024

(54) METHOD FOR AN IMPROVED INFORMATION STORAGE AND RETRIEVAL SYSTEM

(71) Applicant: Charles Landreville, Chelsea (CA)

(72) Inventor: Charles Landreville, Chelsea (CA)

( * ) Notice: Subject to any disclaimer, the term of this patent is extended or adjusted under 35 U.S.C. 154(b) by 381 days.

(21) Appl. No.: 16/425,236

(22) Filed: May 29, 2019

(65) Prior Publication Data

US 2019/0279310 A1    Sep. 12, 2019

(51) Int. Cl.
*G06Q 40/12* (2023.01)
*G06F 16/23* (2019.01)

(52) U.S. Cl.
CPC ....... *G06Q 40/123* (2013.12); *G06F 16/2379* (2019.01)

(58) Field of Classification Search
CPC .......................... G06Q 40/123; G06F 16/2379
See application file for complete search history.

(56) References Cited

U.S. PATENT DOCUMENTS

| | | | | |
|---|---|---|---|---|
| 8,046,343 B2* | 10/2011 | Mukundan | ............... | G06F 9/547 707/706 |
| 8,229,861 B1* | 7/2012 | Trandal | ................... | G06Q 40/08 705/26.1 |
| 8,797,897 B1* | 8/2014 | Bhatt | ...................... | H04L 49/65 370/386 |
| 9,589,259 B2* | 3/2017 | McNeel | ............... | G06Q 20/202 |
| 2002/0107853 A1* | 8/2002 | Hofmann | ............... | G06F 16/335 |
| 2009/0276340 A1* | 11/2009 | Knapp | ................... | G06Q 30/04 705/30 |
| 2017/0161315 A1* | 6/2017 | Guzman | ............. | G06F 16/2379 |
| 2018/0137494 A1* | 5/2018 | Matsukura | ........... | G06Q 20/201 |

FOREIGN PATENT DOCUMENTS

| | | | | |
|---|---|---|---|---|
| CA | 02853346 A | * | 12/2014 | ............. G06Q 40/00 |
| WO | WO-2014004478 A1 | * | 1/2014 | ......... G06F 17/3069 |
| WO | WO-2016123178 A1 | * | 8/2016 | ........... G06Q 40/123 |

OTHER PUBLICATIONS

Li, Susan: A Gentle Introduction on Market Basket Analysis—Association Rules, Sep. 24, 2017, pp. 1-21. (Year: 2017).*
Peter Tan: Creditor Statement Report, 2013, pp. 1-4 (Year: 2013).*
O'Reilly: Data,Table and Database Design, Jan. 1, 2004, pp. 1-64 (Year: 2004).*
Li, Susan: A Gentle Introduction on Market Basket Analysis—Association Rules, Sep. 24, 2017, Towards Data Science, pp. 1-21. (Year: 2017).*

* cited by examiner

*Primary Examiner* — Bijendra K Shrestha

(74) *Attorney, Agent, or Firm* — Global Intellectual Property Agency; Daniel Boudwin

(57) ABSTRACT

A method for data storage and retrieval having a plurality of steps. The method starts by first entering a first set of information into a first table. Second, learning associations based on the first set of information, where the associations may be based on purchases and creditors. Third, populating a second table with records of the associations. Fourth, entering a partial set of second information, where the information may be a credit card statement. Fifth, completing the second set of information using the records of associations in the second table.

2 Claims, 4 Drawing Sheets

METHOD FOR AN IMPROVED INFORMATION STORAGE AND RETRIEVAL SYSTEM

BACKGROUND OF THE INVENTION

The present invention relates to a method and apparatus for an improved information storage and retrieval system. More particularly, the present invention provides a method for an improved information storage and retrieval system when entering information from multiple sources into one data table.

Computers have become a staple in everyday life over the last few decades. There is still a constant need to update the computing processes. These updates can add to the physical machines or the logic that makes them function. In some respects, larger faster memories can be created. In others, new machine code is needed to improve the functionality of a computer. Many times, new ways to store and retrieve information can go a long way to improving computer functionality. These fast response times have become an expected feature by most users. Engineers are constantly creating improvements to computers and the processes which run them.

Consequently, there is always a need in for an improvement in the art of data storage and retrieval. The present invention substantially diverges in design elements from the known art while at the same time solves a problem many people face in data storage and retrieval. In this regard, the present invention substantially fulfills these needs.

SUMMARY OF THE INVENTION

The present invention provides a method and apparatus for an improved information storage and retrieval system wherein the same can be utilized for providing convenience for the user when entering and retrieving information in a data base. The present system comprises a plurality of steps. First, entering a first set of information into a first table. Second, learning associations based on the first set of information, where the associations may be based on purchases and creditors. Third, populating a second table with records of the associations. Fourth, entering a partial set of second information, where the information may be a credit card statement. Fifth, completing the second set of information using the records of associations in the second table.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
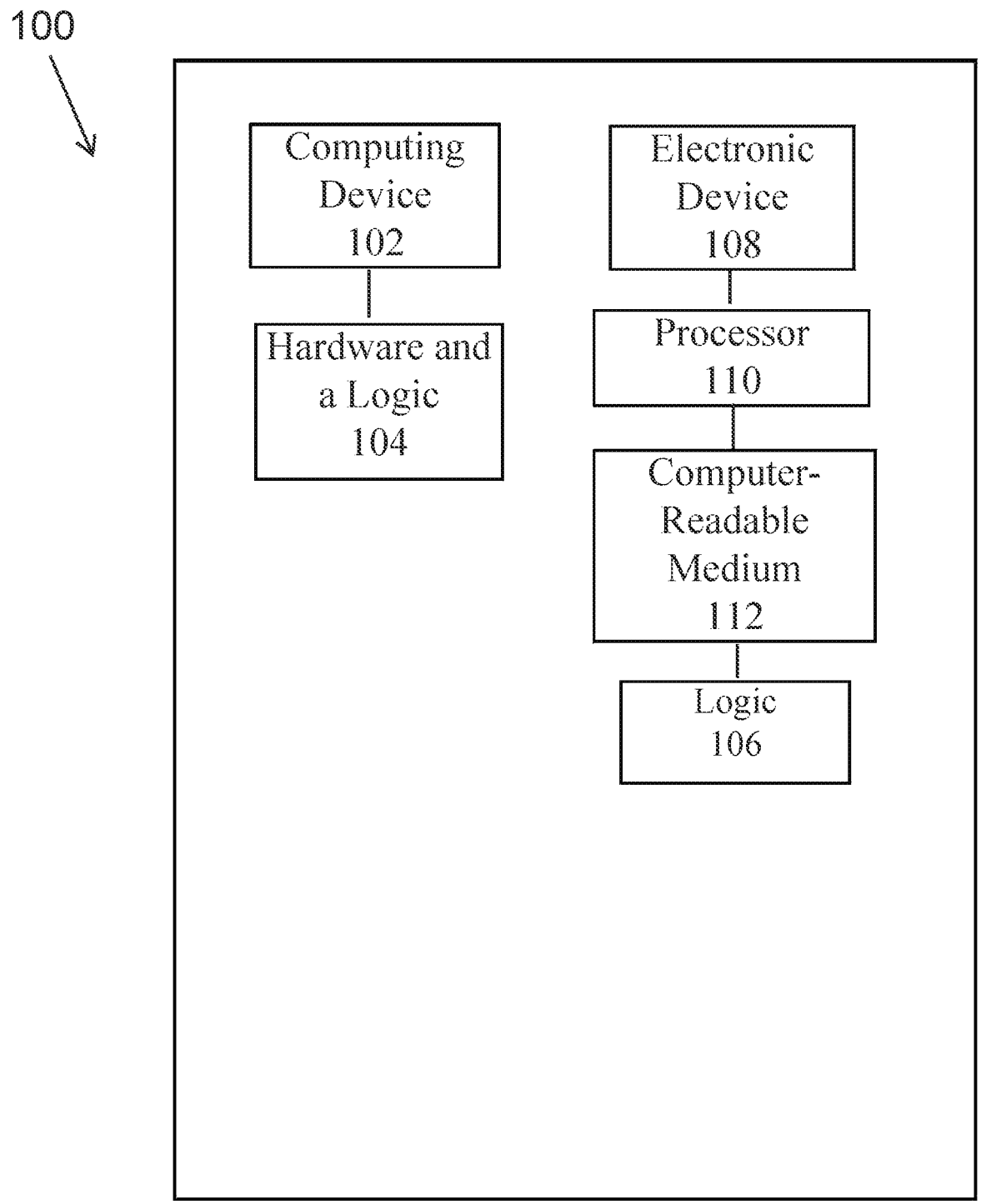
FIG. 1 shows a system overview of a system for improved data storage and retrieval.

Reference is made herein to the attached drawings. Like reference numerals are used throughout the drawings to depict like or similar elements of the data storage and retrieval system. For the purposes of presenting a brief and clear description of the present invention, the preferred embodiment will be discussed as used for the data storage and retrieval system. The figures are intended for representative purposes only and should not be considered to be limiting in any respect.

Referring now to FIG. 1 shows a system overview of a system for improved data storage and retrieval 100. According to some embodiments, the operations, techniques, and/or components described herein can be implemented as (i) a special-purpose computing device 102 having specialized hardware and a logic 104 hardwired into the computing device to persistently perform the disclosed operations and/or techniques or (ii) a logic 106 that is implementable on an electronic device 108 having a general purpose hardware processor 110 to execute the logic and a computer-readable medium for data storage and retrieval 112, e.g. a memory, wherein implementation of the logic by the processor on the electronic device 110 provides the electronic device with the function of a special-purpose computing device 102.

In the interests of economy, the present disclosure refers to "a computer-readable medium for data storage and retrieval," "a processor," and so on. However, this should not be read as limiting in any way as the present disclosure contemplates embodiments of the present invention utilizing "one or more computer-readable media," "one or more processors," and so on. Unless specifically limited to a single unit, "a" is intended to be equivalent to "one or more" throughout the present disclosure.

Figure 2:
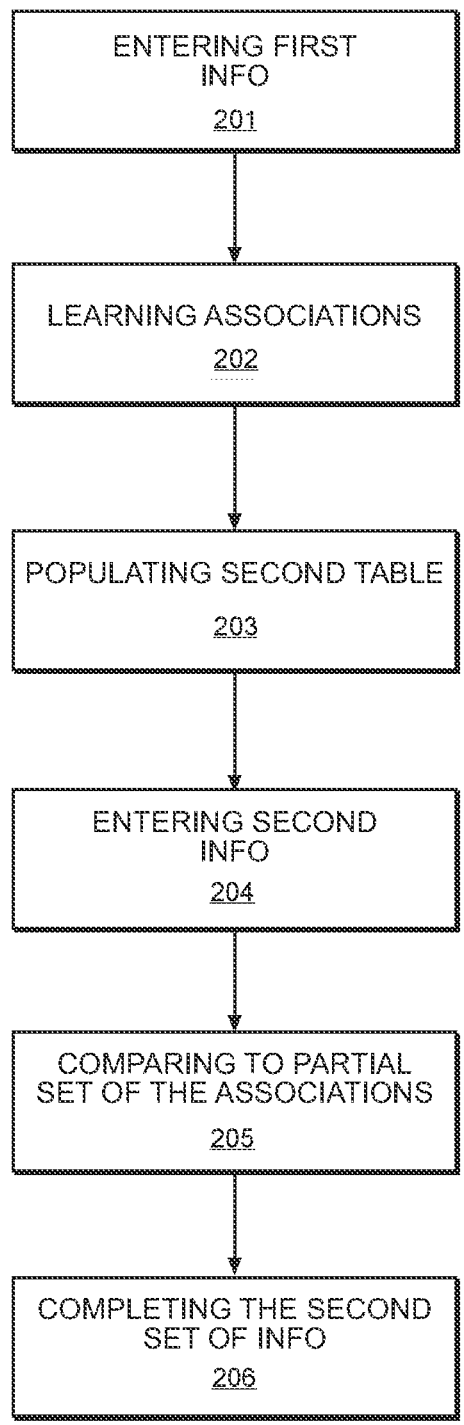
FIG. 2 shows a flow chart of an embodiment of the method for improved data storage and retrieval.

Referring now to FIG. 2, there is shown a flow chart of an embodiment of the method for improved data storage and retrieval 200. The method begins by entering a first set of data 201. In one embodiment, the data is a credit card statement or the like. Associations are then learned. The associations are learned 202 using either a reference number or a series of key words. In one embodiment, a type of good purchase will be linked to a specific reference number. In another embodiment, key words will be used to learn associations between goods and merchants. The associations are then populated in a second table 203. In one embodiment, the associations are creditors and purchases made. The associations are formed by assigning each association with key words and a reference number.

Next a second set of data is entered 204. This second set of data may be a partial set of data. In one embodiment, the second set of data will not have any creditor information. The method will take the second set of data and compare it to the associations 205 in the second table. The second set of data will be completed 206 using the associations. If no association can be found a new association will be learned.

In one exemplary use of the embodiment for storing a credit card statement, a user inputs a date of purchase, a creditors name, the creditors address, and the amount of the purchase. The table will then populate with the correct reference numbers from the associations table in the chart. When future statements are put in the chart, if a creditor is not found, a user can input a new creditor by providing the information above. The new creditor will then be assigned a reference number and key words.

In a large-scale embodiment of the credit card statement, or in an embodiment with a large number of creditors and associations learned when a charge is entered with no creditor, the program can search for an association. This search can be done using word association. Each creditor will be given a list of key words or products. When a purchase is recorded with no creditor the method searches for a key word. When a key word is found the association is then suggested. A user can then accept this new association or learn one of their own.

Figure 3:
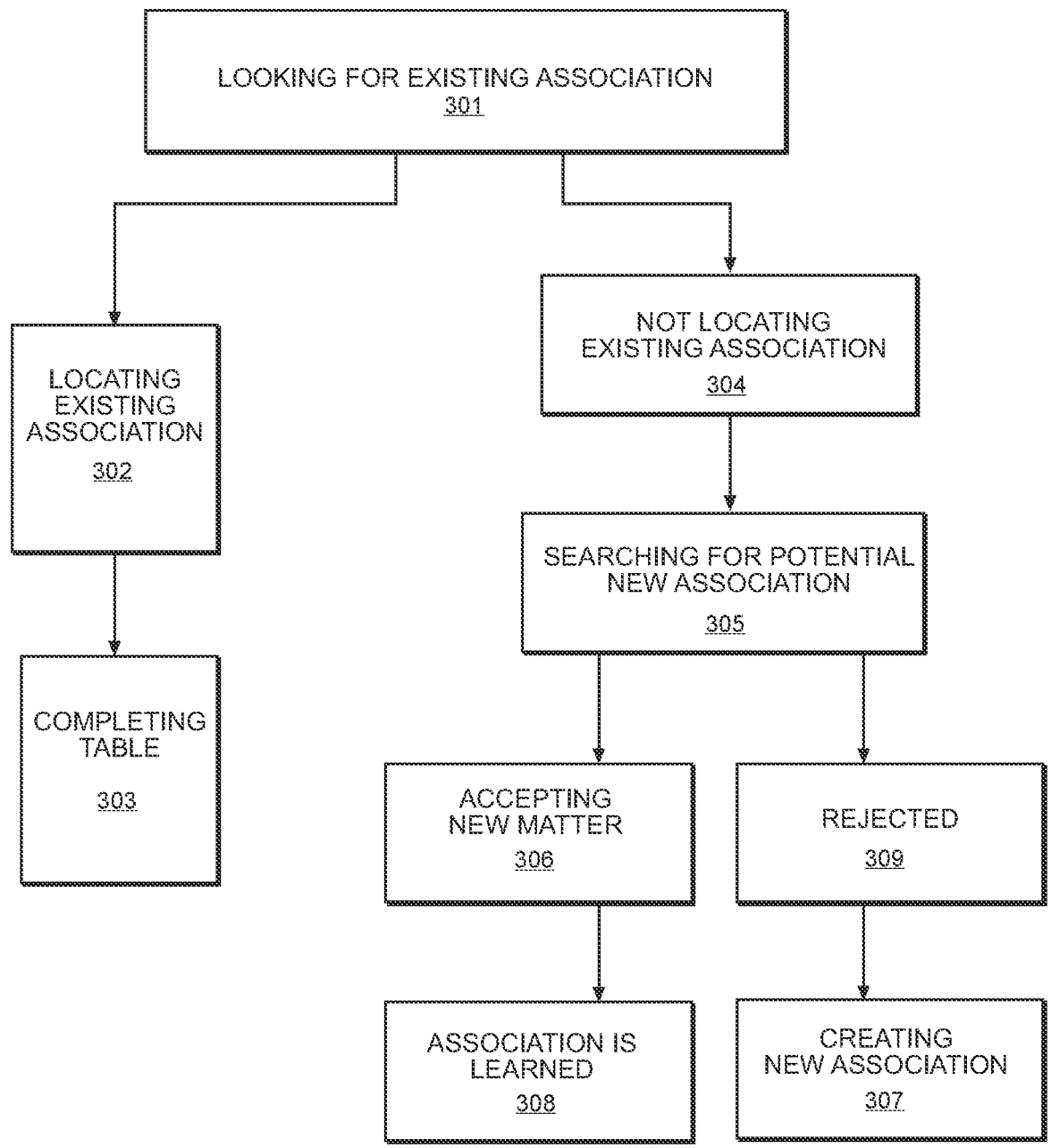
FIG. 3 shows a flow chart of an embodiment of part of the method that locates or forms associations.

Referring now to FIG. 3, there is shown a flow chart of an embodiment of part of the method that locates or forms associations 300. When data is entered, the program looks to find an association 301 to complete the data. In a first embodiment, the data is entered and the program searches the second table for an association. An association is located 302 based on the reference number. The data table is completed 303 with the association.

In a second embodiment, data is entered and the program looks for an association 301. In this embodiment, the program is unable to locate an association 304 using the reference numbers. The program then looks to form a new association 305. The program will search existing associations for key words. A new potential association will be suggested. This suggestion will be made using key words. In one embodiment, the key words will relate the goods purchases to the creditor. The new association can then be accepted 306 or rejected 309. If the association is accepted 306 the association will be learned 307. If the association is rejected a new association can be manually created.

Figure 4:
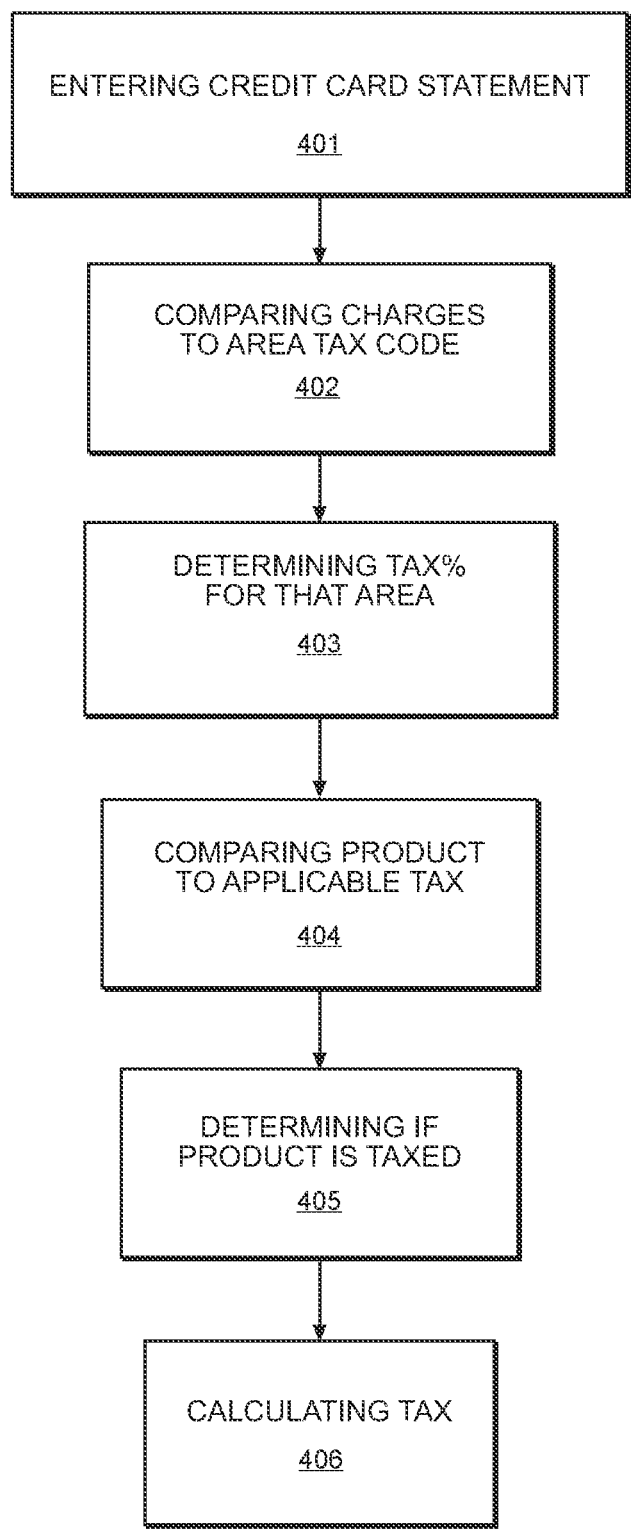
FIG. 4 shows a flow chart of an embodiment of part of the method that calculates taxes.

Referring now to FIG. 4, there is shown a flow chart of an embodiment of part of the method that calculates taxes 400. In various embodiments, the data to be entered is a billing statement or a purchase history or other type of financial statement. In this embodiment, the program can further complete data by suggesting taxes and tax returns. Once the data has been entered 401 and populated a second method may run. This method starts by comparing charges to the area they were made in 402. The method then determines the tax rate or percent for that area 403. There is a third table that is populated with applicable tax rebates 404. The method, uses the third table to determine if the purchase is tax exempt 405 using a look up table. The method will then calculate the tax 406.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method for data storage and retrieval, comprising:
providing a special-purpose computing device comprising a non-transitory computer-readable medium having specialized hardware and a computer program logic hardwired into the computing device to persistently perform the method for data storage and retrieval;
entering a first set of information into a first table;
storing the first table on the non-transitory computer-readable medium;
learning a plurality of associations based on the first set of information;
wherein the plurality of associations is learned using data selected by the computer program from a group consisting of a reference number, a series of keywords, and a combination thereof; wherein the computer program associate a reference number to a type of good purchase; and
the series of keywords is utilized to learn associations between a set of goods and a set of merchants when the computer program is unable to locate the association using the reference number and the computer program associates key words to goods purchased to the creditor;
wherein key words relate goods purchases to a creditor and a new learning association is accepted or rejected; and
wherein the new learning association is accepted and the new learning association is learned,
storing the plurality of associations on the non-transitory computer-readable medium;
populating a second table with records of the plurality of associations;
entering a partial set of second information; and
completing the partial second set of information using the plurality of associations in the second table;
comparing the partial set of second information to records of the of associations in the second table;
wherein the first set of information comprises a creditor statement;
wherein the partial second set of information is a partial creditor statement;
wherein the associations based on the first set of information are specific purchases from specific creditors;
wherein the associations based on the partial set of second information are specific purchases from specific creditors;
wherein the first set of information includes a price spent on purchases from a creditor; and
further comprising the computer program generating a tax return statement based on the first set of information; and assigning an area to each transaction; determining a tax rate associated with the area; and populating a third table with a set of applicable tax rebates.

2. A non-transitory computer storage media having instructions stored thereon which, when executed by a processor, comprising steps of:
providing a special-purpose computing device comprising a non-transitory computer-readable medium having specialized hardware and a computer program logic hardwired into the computing device to persistently perform the method for data storage and retrieval;
entering a first set of information into a first table;
storing the first table on the computer-readable medium;
learning a plurality of associations based on the first set of information; wherein the plurality of associations is learned using data selected by the computer program from a group consisting of a reference number, a series of keywords, and a combination thereof; wherein the computer program associate a reference number to a type of good purchase; and the series of keywords is utilized to learn associations between a set of goods and a set of merchants when the computer program is unable to locate an association using the reference number and the computer program associates key words to goods purchased to the creditor; wherein key words relate goods purchases to a creditor and a new learning association is accepted or rejected; and wherein the new learning association is accepted and the new learning association is learned;

storing the plurality of associations on the non-transitory computer-readable medium;

populating a second table with records of the plurality of associations;

entering a partial set of second information; and completing the partial second set of information using the plurality of associations in the second table;

comparing the partial set of second information to records of the associations in the second table;

wherein the first set of information is a creditor statement;

wherein the partial second set of information is a partial creditor statement;

wherein the associations based on the first set of information are specific purchases from specific creditors;

wherein the associations based on the partial set of second information are specific purchases from specific creditors;

wherein the first set of information and the partial second set of information includes a price spent on purchases from a creditor; and further comprising the computer program generating a tax return statement based on the first set of information; and generating a tax return statement based on the partial second set of information; assigning an area to each transaction; determining a tax rate associated with the area; populating a third table with a set of applicable tax rebates.

\* \* \* \* \*